(12) United States Patent
Jones

(10) Patent No.: X7287
(45) Date of Patent: Nov. 10, 1832

(54) STEAM ENGINE, ROTARY

(76) Inventor: William Jones

The Schedule referred to in these Letters Patent, and making part of the same, containing a description in the words of the said William Jones himself of his improvement in the Rotary Steam Engine.

---

Be it Known that I, William Jones of the Town of Bradford, County of Orange & State of Vermont have made an improvement in the Rotary Steam Engine, which is described as follows.

This rotary steam engine consists of the following principal parts. — The cap or casing. The Steam Wheel & chambers. The valves & springs. The Contractor. The Fixed Stop. The induction & eduction pipes for the steam. The side plates.

The Cap or Casing is made of metal, and is made steamtight by means of packing, placed on each side of the circle which forms the middle part of the [illegible]. The Steam Chambers in which the valves or floats work, are formed by means of this casing & side plates to be hereafter described.

The Steam Wheel is circular & turned perfectly true & smooth, & of any suitable size. It is divided into four equal parts more or less, having openings ~~in to it in which the valves work to be hereafter described:~~ and compartments to receive the springs & the arms for working them. — This wheel is fixed on a metallic axle, & is made to work steam tight with the side plates. —

The Valves & Springs. The valves are formed by making them of the width of the steam wheel & of a suitable thickness; a notch or [illegible] opening is made in the outer side of the valve in which the packing is placed, & a small plate is secured on to hold it fast in the valve.

At the inner end of the valve is an arm to which is attached a spring for throwing out the valve against the outer rim or casing: this packing also extends out at the sides of the valves so as to work steam tight against the end plates. To the before mentioned arm is fixed an upright round piece of metal with or without friction rollers, working in the contractor to be hereafter described.

The Contractor: This is formed by making a plate of any convenient size, or it may be cast on the casing. In this plate is made two semi-circles, one of a greater diameter than the other, & falling into each other, making [illegible] notch or jog.

The Contractor is for working the valves & springs for letting on or off the steam.

A fixed stop is screwed on, or cast on the inner part of the rim or center part of the casing, it is made of the shape of an inclined plane, one end being a feather edge & the other a jog or shoulder.

The induction & eduction pipes, are openings placed in the center rim or casing at about a quarter circle apart: one is put near the shoulder of the stop & the other near the feather edge of the same.

The side plates are made perfectly true & are secured together with bolts, running thro' from side to side, forming with the center rim completely tight steam chambers.

Operation

The steam enters at the induction pipe, & presses against one of the moveable valves & fixed stop, which carries round the steam wheel till the valves are acted on by the contractor [illegible] steam is then let off by the eduction pipe, thus producing a continued rotary motion of the wheel. —

What I claim as my invention is the before described rotary Steam Engine particularly the springs arms & contractors.

For a further illustration of my invention I refer to the model & Drawing of the same deposited in the Patent office.

In testimony whereof I have hereunto subscribed my name this 1st. day of November 1832

Witnesses
Wm. P. Elliot
Rob. Clarke

William Jones

Exd.
W.J.C.

(7080.83)

Patented November 10. 1832